United States Patent
Han et al.

(10) Patent No.: US 6,430,200 B1
(45) Date of Patent: Aug. 6, 2002

(54) APPARATUS AND METHOD FOR GENERATING A PILOT SIGNAL IN ORDER TO PERFORM A HARD HAND-OFF

(75) Inventors: Deog-Su Han, Seoul; Dae-Sik Kim, Sungman, both of (KR)

(73) Assignee: Samsung Electronics, Co., Ltd. (KR)

( * ) Notice: Subject to any disclaimer, the term of this patent is extended or adjusted under 35 U.S.C. 154(b) by 0 days.

(21) Appl. No.: 09/157,185

(22) Filed: Sep. 18, 1998

(30) Foreign Application Priority Data

Sep. 18, 1997 (KR) .......................................... 97-47507
May 14, 1998 (KR) .......................................... 98-17370

(51) Int. Cl.$^7$ ................................................ H04B 3/10
(52) U.S. Cl. ...................... 370/500; 370/331; 370/335; 370/342
(58) Field of Search ................................ 370/320, 330, 370/331, 332, 335, 342, 344, 441, 500

(56) References Cited

U.S. PATENT DOCUMENTS

| | | | | |
|---|---|---|---|---|
| 4,717,916 A | * | 1/1988 | Adams et al. | ............... 342/107 |
| 5,046,136 A | * | 9/1991 | Tokunaga et al. | ........... 455/343 |
| 5,594,718 A | | 1/1997 | Weaver, Jr. et al. | |
| 5,649,000 A | | 7/1997 | Lee et al. | |
| 5,901,145 A | * | 5/1999 | Sawyer | ....................... 370/332 |
| 6,035,197 A | * | 3/2000 | Haberman et al. | .......... 455/439 |
| 6,079,017 A | * | 6/2000 | Han et al. | ....................... 713/2 |
| 6,233,456 B1 | * | 5/2001 | Schiff et al. | ................ 455/439 |
| 6,240,292 B1 | * | 5/2001 | Haberman et al. | .......... 455/439 |

\* cited by examiner

Primary Examiner—Hassan Kizou
Assistant Examiner—Tim Spafford
(74) Attorney, Agent, or Firm—Dilworth & Barrese, LLP

(57) ABSTRACT

An apparatus and method for generating a pilot signal for hard hand-off. A pilot signal generator of a base station for generating an identifying pilot signal corresponding to a target base station to perform inter-frequency hard hand-off in the code division multiple access cellular system comprises an intermediate frequency amplifier/divider, a service RF path unit and a RF path unit. The IF amplifier/divider divides the amplified IF signal transferred from a digital MODEM. The service RF path unit up-converts a first portion of the divided signal into a desired radio frequency and transmits the up-converted RF signal for actual communication and the RF path unit up-converts a second portion of the divided signal into a desired RF and transmits the up-converted RF signal as an identifying pilot signal corresponding to a target base station for a hard hand-off. When the IF amplifier/divider that is included in the conventional digital MODEM only transfers a signal to the RF path unit, the RF path unit then transmits all signals converted by an overhead channel or traffic channel. The RF path unit is portable for easy insertion or extraction.

40 Claims, 9 Drawing Sheets

APPARATUS AND METHOD FOR GENERATING A PILOT SIGNAL IN ORDER TO PERFORM A HARD HAND-OFF

BACKGROUND

1. Technical Field

The present application relates generally to a communication system and, more particularly, to an apparatus and method for generating a pilot signal for performing a hard hand-off in a code division multiple access (CDMA) cellular system using an External Pilot Transmitter (EPT).

2. Description of the Related Art

In a cellular mobile telephone system, the cellular service area is divided into a plurality of sub-areas (i.e., cells), and each cell has a base station associated therewith. In a cellular communication system, a single mobile switching center (MSC) controls all base stations, and allows a mobile station to continue communication when the mobile station travels between several service cells. In a code division multiple access (CDMA) cellular communication system or a personal communication service (PCS) system, various types of hand-off operations are utilized to ensure continuous communication when the mobile station travels between cells (i.e., when a mobile station travels from a "source base station" to a "target base station").

One type of hand-off operation is referred to as a "hard hand-off." During a hard hand-off operation, when a mobile station enters a target cell (or target base station), communication with the source base station is terminated, and then communication with the target base station is established. The hard hand-off process is completed within a very short time and the user of the mobile station does not even recognize the temporary termination of communication.

In a CDMA cellular system, frequency assignment to the various cells is typically offset due to the unbalanced distribution of subscribers. For instance, downtown city areas generally require more traffic capacity to service a large number of subscribers, whereas suburban areas require relatively less traffic capacity due to a smaller number of subscribers. Consequently, when a target base station (in which a mobile station enters) does not have a frequency assignment through which communication is currently established, or when, if any, the frequency assignment does not have enough traffic channels, a hard hand-off cannot occur.

A hard hand-off is generally performed as follows. The source base station continuously measures the signal strength of a mobile station within its cell region to determine if the signal strength drops below a predetermined threshold value. When the received signal strength falls below the threshold, the source base station determines that the mobile station is located at the boundary of its cell region, and then signals a base station controller (BSC). The BSC then decides which base station (i.e. target base station) receives a relatively strong signal from the mobile station.

When it is determined that a particular target base station (e.g., a neighboring base station) receives a strong signal, the BSC transmits a hand-off request message to the target base station, as well as a command to the mobile station to communicate with the target base station (neighboring base station). The mobile station then performs a hand-off and, accordingly, communication between the mobile station and the target base station is established.

The BSC determines whether to perform a hand-off based on a pilot signal strength of the source base station which is in current communication with the mobile station. In the conventional system, a call will be disconnected if the hand-off to the target base station is unsuccessful. There are various reasons for a hand-off operation to fail. For instance, a hand-off operation can fail if there are no available channels in the target cell for communicating the call or if the mobile station fails to receive a hand-off message. A hand-off can also be requested when a mobile station enters a shadow area of the cell area in which the pilot signal strength becomes weak. Furthermore, it is very difficult to determine a hand-off determination parameter and time in the varying cellular communication environment. And there is trade-off between coverage areas to reduce the possibility of success to perform a hand-off.

A conventional method for performing a hard hand-off using a pilot signal is disclosed in U.S. Pat. No. 5,594,718 entitled "A Method and Apparatus For Providing Mobile Unit Assisted Hard Handoff From A CDMA Communication System To An Alternative Access Communication System." This method uses a pilot beacon for generating an identifying pilot signal corresponding to a target base station in order to overcome the above difficulties.

Referring now to FIG. 1, a diagram illustrates a conventional pilot signal generator for generating a pilot signal for performing a hard hand-off in accordance with the prior art. Each base station has a RF path unit, which includes a plurality of digital MODEMs 200, 210 and 220 for converting audio frequencies into intermediate frequencies, a plurality of transceivers 300, 310 and 320 for converting the intermediate frequencies into radio frequencies and a plurality of power amplifiers 400, 410 and 420 for amplifying the RF signals which are transmitted from an antenna. The digital MODEMs 200 and 210, transceiver 300 and 310, and power amplifiers 400 and 410 are utilized for communication, whereas a pilot signal generator (which generates an identifying pilot signal corresponding to a target base station) includes the digital MODEM 220 for generating a pilot signal, the transceiver 320 and the power amplifier 420. As a mobile station moves to a target base station, the mobile station simultaneously receives a weak pilot signal from the source base station and a relatively strong pilot signal from the target base station. Accordingly, the mobile station will request a hand-off and the digital MODEM 220 of the pilot signal generator will only transmit the overhead channel such as, for example, a pilot, synchronization, and paging.

The transmission of the overhead channel (as described above) causes an unbalance of coverage areas of multiple frequencies, and this unbalance increases the load of the primary frequency. Specifically, when the coverage area of the pilot signal generator is greater than that of the forward link of the primary frequency, a mobile station will more frequently request a hand-off in a base station having a pilot signal generator than in the balanced base station where the coverage area of the primary frequency is almost balanced with that of the pilot signal generator. Accordingly, a call will more frequently be handed down to the primary frequency, which results in an increase of the load of the primary frequency and reduces the performance of the entire system. A pilot digital gain modulation can control the unbalance of the coverage areas, but it is very difficult to modulate a pilot digital gain taking into consideration the actual radio environment and system operation.

In addition, when the pilot signal generator is added to the base station, it requires space for installation; a digital hardware MODEM, and a channel card. The digital hardware MODEM is used for a hand-off (not for actual communication), and for generating some channels such as a pilot channel, synchronization channel and paging channel. This pilot signal generator is not portable because it is installed in an outdoor device.

There are various disadvantages associated with the conventional pilot signal generator. For example, the pilot signal generator is physically large and significantly costly due to the large space required for installation. Moreover, the conventional pilot signal generator is not portable and requires a significant amount of labor to install it, or extract it, from the system. In addition, as stated above, it causes unbalance in coverage areas of multiple frequencies.

SUMMARY OF THE INVENTION

It is an object of the present invention to provide a method and apparatus for generating a pilot signal for a hard hand-off using an IF amplifier/divider without having to add the pilot signal device to frequency allocation generating hardware, the IF amplifier/divider being easily coupled to a digital MODEM.

It is another object of the present invention to provide a method and apparatus for generating a pilot signal to produce output to every channel in order to balance the system load.

It is a further object of the present invention to provide an apparatus for generating a pilot signal which does not require physical space and is portable.

In one aspect of the present invention, a pilot signal generator of a base station for generating an identifying pilot signal corresponding to a target base station in order to perform an inter-frequency hard hand-off operation in a code division multiple access cellular communication system, comprises an intermediate frequency (IF) amplifier/divider for dividing an intermediate frequency (IF) signal which is received from a digital MODEM; a service radio frequency (RF) path unit for up-converting a first portion of the divided signal into a radio frequency and transmitting the radio frequency, the service RF path unit being utilized solely for actual communication; and a radio frequency (RF) path unit for up-converting a second portion of the divided signal into a radio frequency and transmitting the radio frequency where the RF is used as an identifying pilot signal corresponding to the target base station for a hard hand-off, the RF path unit being used solely for transmission of a pilot signal.

In another aspect of the present invention, a method for generating a pilot signal for performing an inter-frequency hard hand-off in a CDMA cellular communication system, where a base station uses an identifying pilot signal corresponding to a target base station for performing an inter-frequency hard hand-off operation, includes the steps of: generating an intermediate frequency signal for communication by a digital MODEM; dividing the intermediate frequency signal to multiple paths; transmitting the up-converted signal to a service RF path unit for communication after up-converting a first portion of the divided signal; and transmitting the up-converted signal to at least one RF path unit in order to generate a pilot signal of a target base station after up-converting a second portion of the divided signal.

In yet another aspect of the present invention, a method for generating a pilot signal of a target base station for performing an inter-frequency hard hand-off operation in a CDMA cellular communication system includes the steps of: transmitting, at a RF path unit, all signals converted by an overhead channel or traffic channel, where the RF path unit transfers a target base station pilot signal for a hard hand-off; and transmitting, at a RF path unit, the up-converted signal after up-converting a signal of a path for a primary frequency.

These and other objects, features, and advantages of the present invention will become apparent from the following detailed description of illustrative embodiments, which is to be read in connection with the accompanying drawings.

DETAILED DESCRIPTION OF PREFERRED EMBODIMENTS

The present invention is directed to a method and apparatus for generating a pilot signal for performing a hand-off, whereby an IF amplifier/divider is added to a conventional digital MODEM such that the digital MODEM generates both a pilot signal for communication and a pilot signal for a hard hand-off. In addition, a radio frequency path unit transmits all signals converted by an overhead channel or traffic channel to balance the coverage areas of multiple frequencies.

Figure 2:
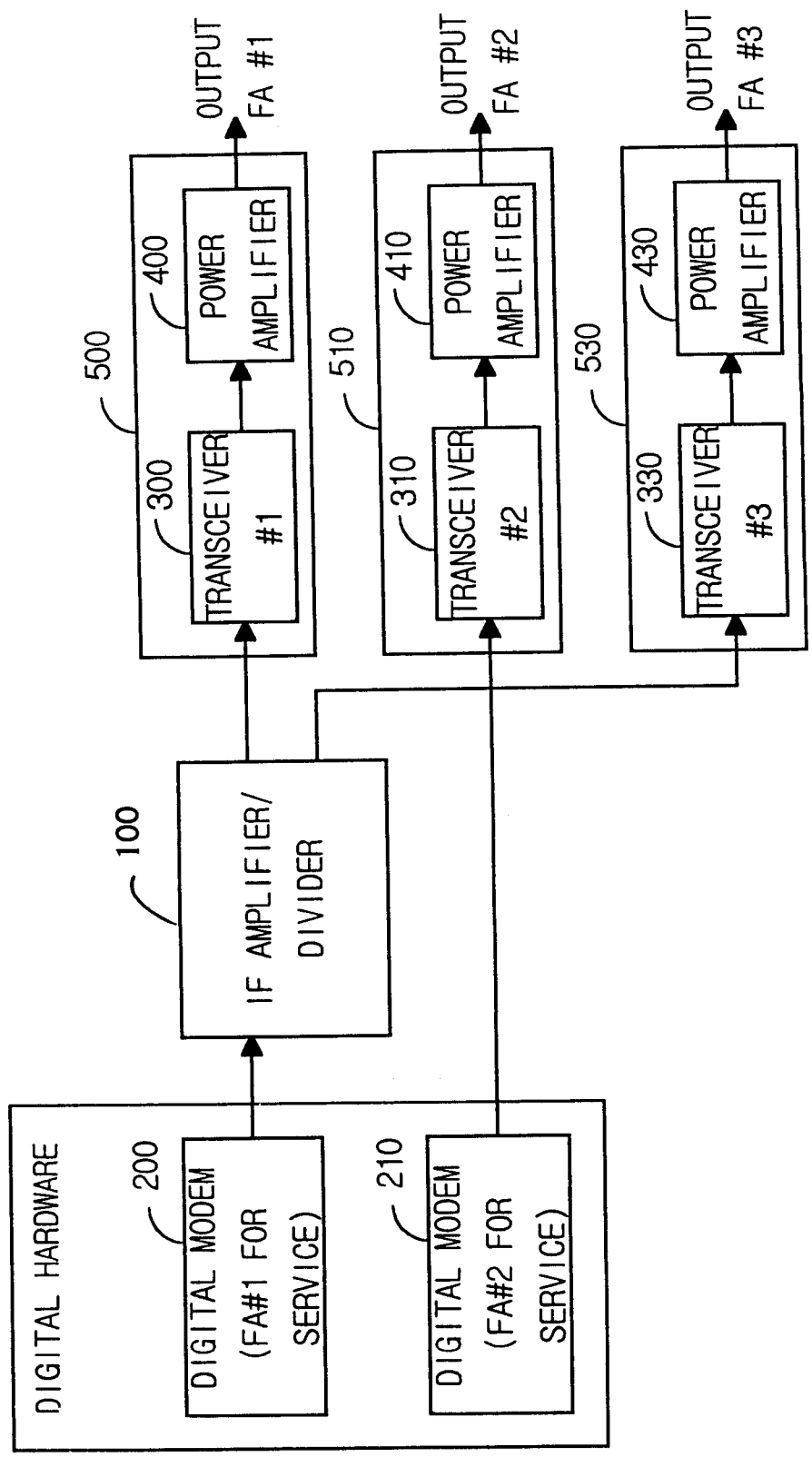
FIG. 2 is a block diagram of a base station having an amplifier/divider according to an embodiment of the present invention.

Referring now to FIG. 2, a block diagram illustrates a base station having an IF amplifier/divider in accordance with one embodiment of the present invention. The base station includes a first digital MODEM 200 and an IF amplifier/divider 100. The first digital MODEM 200 produces an intermediate frequency which results in frequency #1. The IF amplifier/divider 100 divides a signal from the digital MODEM 200 into a service RF path unit 500 (which includes a transceiver 300 and a power amplifier 400) and an RF path unit 530 (which includes a transceiver 330 and a power amplifier 430. A second digital MODEM 210, which is coupled to a service RF path unit 510 (which includes a transceiver 310 and a power amplifier 410), produces an intermediate frequency which results in a frequency #2. It is to be understood that the term "service RF path unit" used herein will refer to an RF path unit that is used solely for actual communication, whereas the term "RF path unit" will refer to an RF path unit that is used solely for transmission of a pilot signal.

Figure 1:
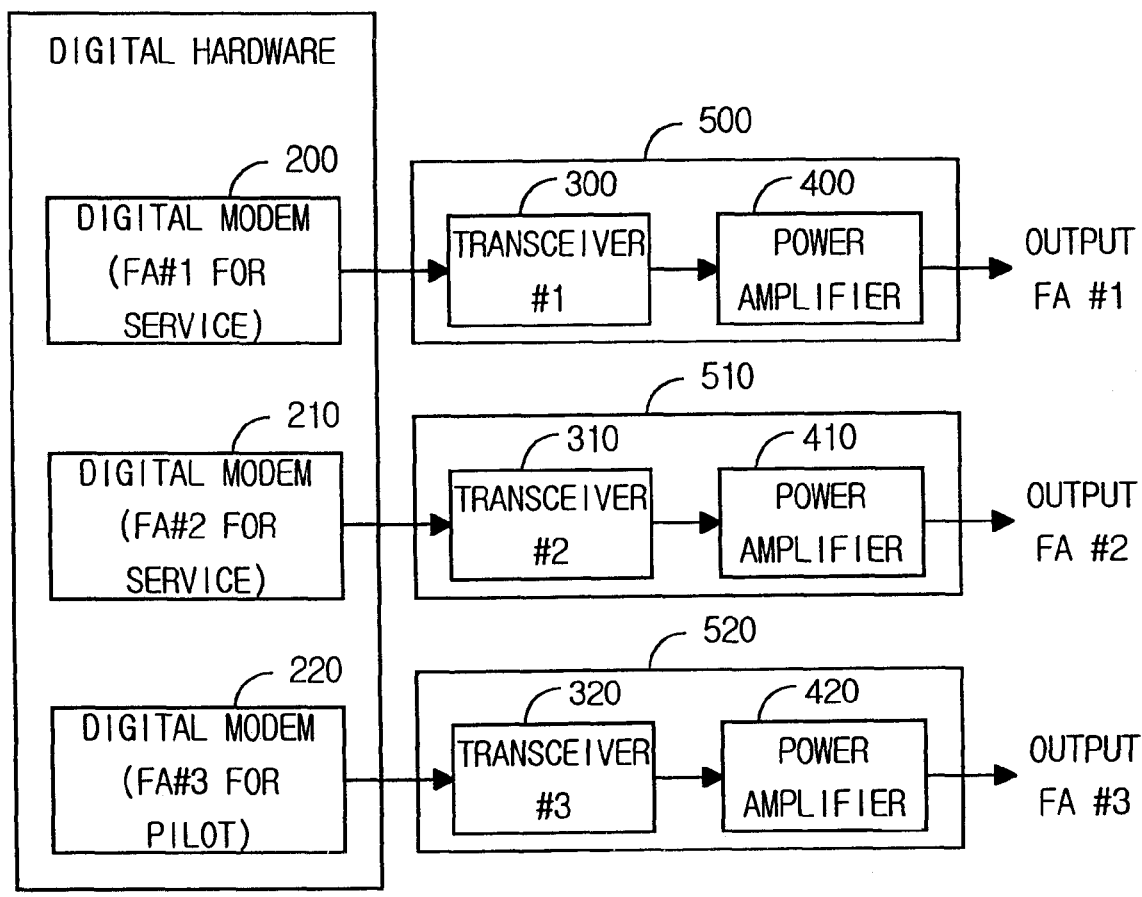
FIG. 1 is a diagram of a conventional pilot signal generator for generating a pilot signal corresponding to a target base station for performing a hard hand-off.

As discussed above, the conventional digital MODEM (e.g., MODEM 200 in FIG. 1) produces a signal that results in a frequency #1 for actual communication. However, in a preferred embodiment according to the present invention, the IF amplifier/divider 100 coupled to the digital MODEM 200 (FIG. 2) transmits a first portion of the divided IF signal through the service RF path unit 500 for generating a frequency #1 (which is utilized for actual communication), and a second portion of the divided IF signal through the RF path unit 530 for producing frequency #3 (which is utilized for generating a pilot signal).

The digital MODEM 200 coupled to the IF amplifier/divider 100 transmits all signals converted by an overhead channel or traffic channel. Accordingly, the RF path unit 530 can balance coverage areas of multiple frequencies by transmitting both signals converted by an overhead channel and traffic channel. It is preferable to provide a digital MODEM (which produces the primary frequency available to all base station) which divides a signal and a pilot signal generator which produces a pilot signal. This is because the coverage area of a signal from the pilot signal generator can be balanced in a coverage area of the primary frequency signal.

As explained in further detail below, a signal is transferred via an amplify path that is selected by the IF amplifier/divider 100 to a power divider which divides the signal into desired number of signals. In this manner, it is easy to increase or decrease the number of frequencies and pilots as demanded. This increase and decrease of the RF path unit is based on the number of subcells. That is, one RF path unit is allocated to one subcell. For example, when a hand-off is performed over two sectors, the system is designed such that transceivers and power amplifiers of the two sectors are connected to one path of the IF amplifier/divider 100.

Conventionally, the IF amplifier/divider includes an IF amplifier for amplifying an input signal, an attenuator coupled to the IF amplifier for attenuating an unnecessary gain and a N-way power divider for dividing the signal transferred from the attenuator into N paths. The N-way power divider divides the amplified signal into a path for frequency #1 and also divides into a path for transmission of a pilot signal. This problem with this circuit is that neither a signal for actual communication nor a pilot signal will be transferred when a fault occurs in the RF amplifier or attenuator. In the present invention, however, an amplify path is dualized and a self-switched circuit is utilized for detecting a fault in order to provide a safer method. In order to dualize an amplify path, either an amplifier can be dualized or both an amplifier and attenuator can be dualized.

Figure 3:
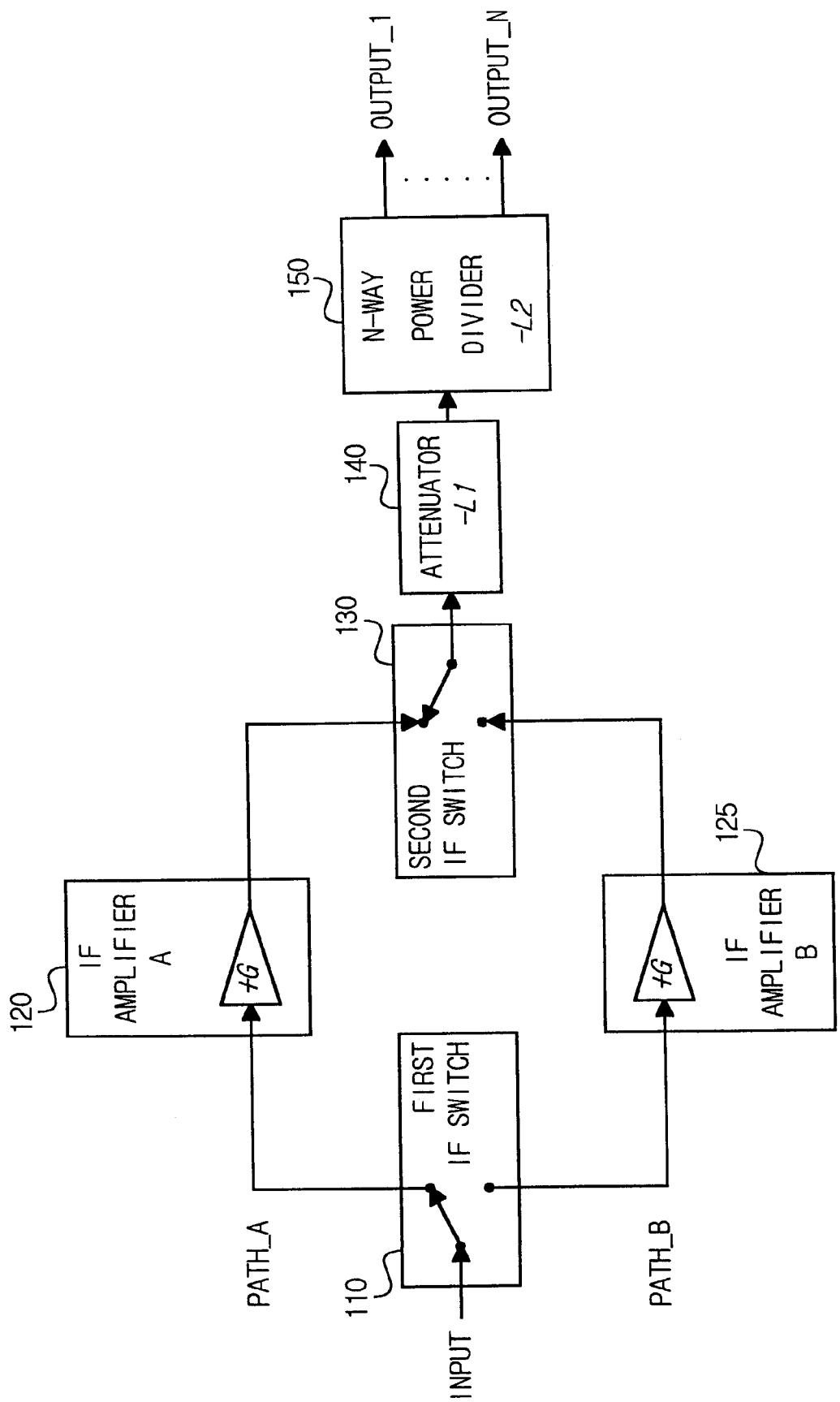
FIG. 3 is a block diagram of a self-switched IF amplifier/divider 100 according to an embodiment of the present invention.

Referring now to FIG. 3, a block diagram illustrates a self-switched IF amplifier/divider 100 according to one embodiment of the present invention. The self-switched IF amplifier/divider 100 includes; a first IF switch 110 for selecting one of an IF amplify path-A and an IF amplify path__B for transmitting an IF signal received from a digital MODEM (not shown). An IF amplifier A 120 amplifies an IF signal transmitted on path__A and an IF amplifier B 125 amplifies an IF signal transmitted on path__B. A second IF switch 130 is provided for selectively coupling the amplified IF signals on path__A or path__B to an attenuator 140. The attenuator 140 attenuates unnecessary gain of the amplified IF signals on path__A or path__B, whereby the unnecessary gain is expected to be the overall gain generated by the entire IF amplifier/divider circuit. A N-way power divider 150 is connected to the attenuator 140 for transmitting the attenuated signal to N paths.

The first IF switch 110 and the second IF switch 130 switch each input signal to each output signal. The IF amplifiers A 120 and B 125 amplify the input signal by a predetermined value. The N-way power divider 150 divides the switched input signal into demanded paths. The attenuator 140 attenuates the signal to 0 db so as to decrease the signal gain of a self-switched IF amplifier/divider paths.

Figure 4:
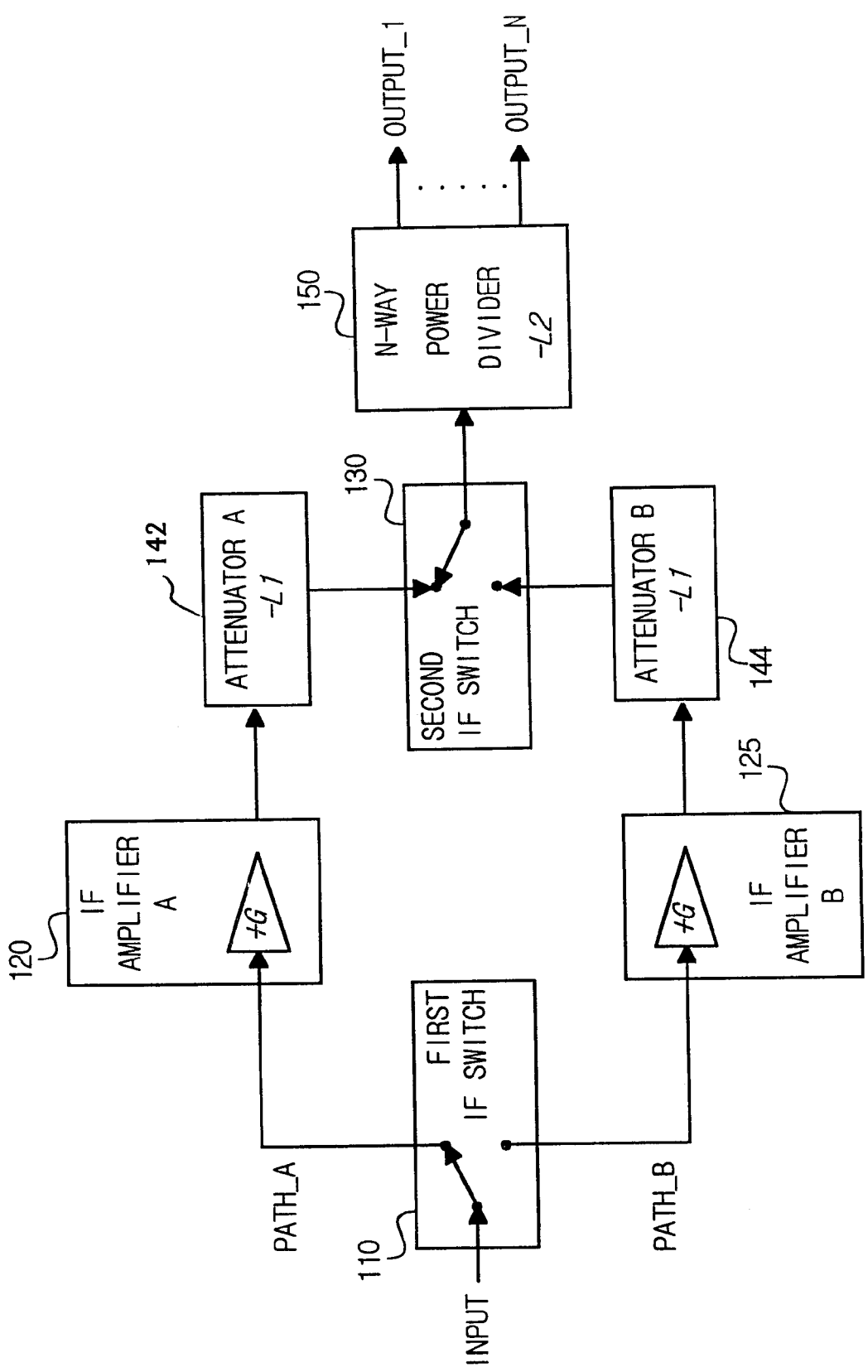
FIG. 4 is a block diagram of a self-switched IF amplifier/divider according to another embodiment of the present invention.

Referring now to FIG. 4, a block diagram illustrates a self-switched IF amplifier/divider according to a second embodiment of the present invention. The IF amplifier/divider includes a first IF switch 110 for selecting between an IF amplify path__A and an IF amplify path__B so as to transmit an IF signal received from a digital MODEM (not shown). An IF amplifier A 120 amplifies the IF signal coupled to path__A via the first IF switch 110 and an attenuator A 142 attenuates unnecessary gain of the amplified signal from the IF amplifier A 120. An IF amplifier B 125 amplifies an IF signal coupled to path__B via the first IF switch 110 and an attenuator B 144 attenuates unnecessary gain of the amplified signal from the IF amplifier B 125. A second IF switch 130 is connected to attenuators A 142 and B 144 for selectively coupling an attenuated signal from attenuator A 142 or attenuator B 144 to an N-way power divider 150. The N-way power divider transmits the attenuated IF signal to N paths. The unnecessary gain, which is attenuated by the attenuator A and B, is the overall gain that is generated by the entire IF amplifier/divider circuit.

The function of the self-switched IF amplifier/divider of FIG. 4 is similar to the function of the self-switched IF amplifier/divider discussed above in connection with FIG. 3. As illustrated both embodiments of the self-switched IF amplifier/divider include an IF amplify path__A and a IF amplify path__B. An input signal to the self-switched IF amplifier/divider is selectively coupled to one path of the paths (i.e., the IF amplify path__A or the IF amplify path__B). The gain of the signal(s) output from N-power divider 150 is preferably 0 dB. Each IF amplifier 120 and 125 has the same power gain G. The power gain G of each IF amplifier 120 and 125 compensates for the insertion loss L2 of the N-way power divider 150. The IF amplifiers 120 and 125 each have a power gain controller for controlling the power gain to keep it steady. Additionally, when a fault occurs in the circuit, the IF amplifier can easily be inserted or removed due to its modular design. In addition, the IF amplifier/divider 100 of the present invention has a constant voltage circuit for converting power transferred from outside into a constant voltage and uses the constant voltage as power. A first IF switch 110 and a second IF switch select 130 the same path at any given time under the control of a switch control circuit (discussed in further detail below).

Figure 5:
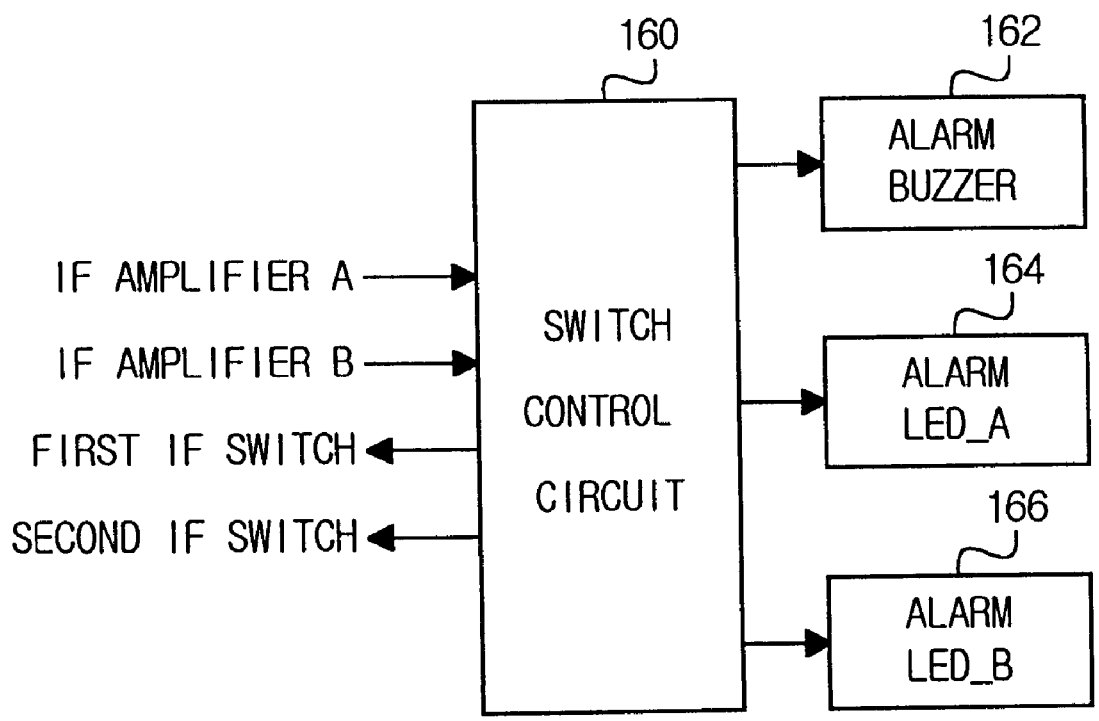
FIG. 5 is a block diagram of an exemplary switch control circuit.

Referring now to FIG. 5, a diagram illustrates an exemplary embodiment of a switch control circuit for checking the operating state of the IF amplify paths A and B, as well as for controlling the operation of the first and second IF switches 110 and 130 shown in FIGS. 3 and 4. Specifically, the IF amplifier/divider 100 has a switch control circuit 160 for detecting an alarm signal from the IF amplifiers A 120 and B 125, and for controlling the switching operation of the first and second IF switches 110 and 130. When the switch control circuit 160 detects a fault in one of the IF amplify paths, it blocks the faulty IF amplify path by signalling the IF switches 110 and 130 to connect to the other (non-fault) IF amplify path.

During initial operation, the switch control circuit 160 signals the first and second IF switches 110 and 130 to select the IF amplify path_A for transmitting a signal. The switch control circuit 160 uses a buzzer 162 to audibly notify a user of an alarm state and/or an alarm LED_A 164 and alarm LED_B 166 to visually notify the user of an alarm state in one of the IF amplify paths A and B.

Figure 6:
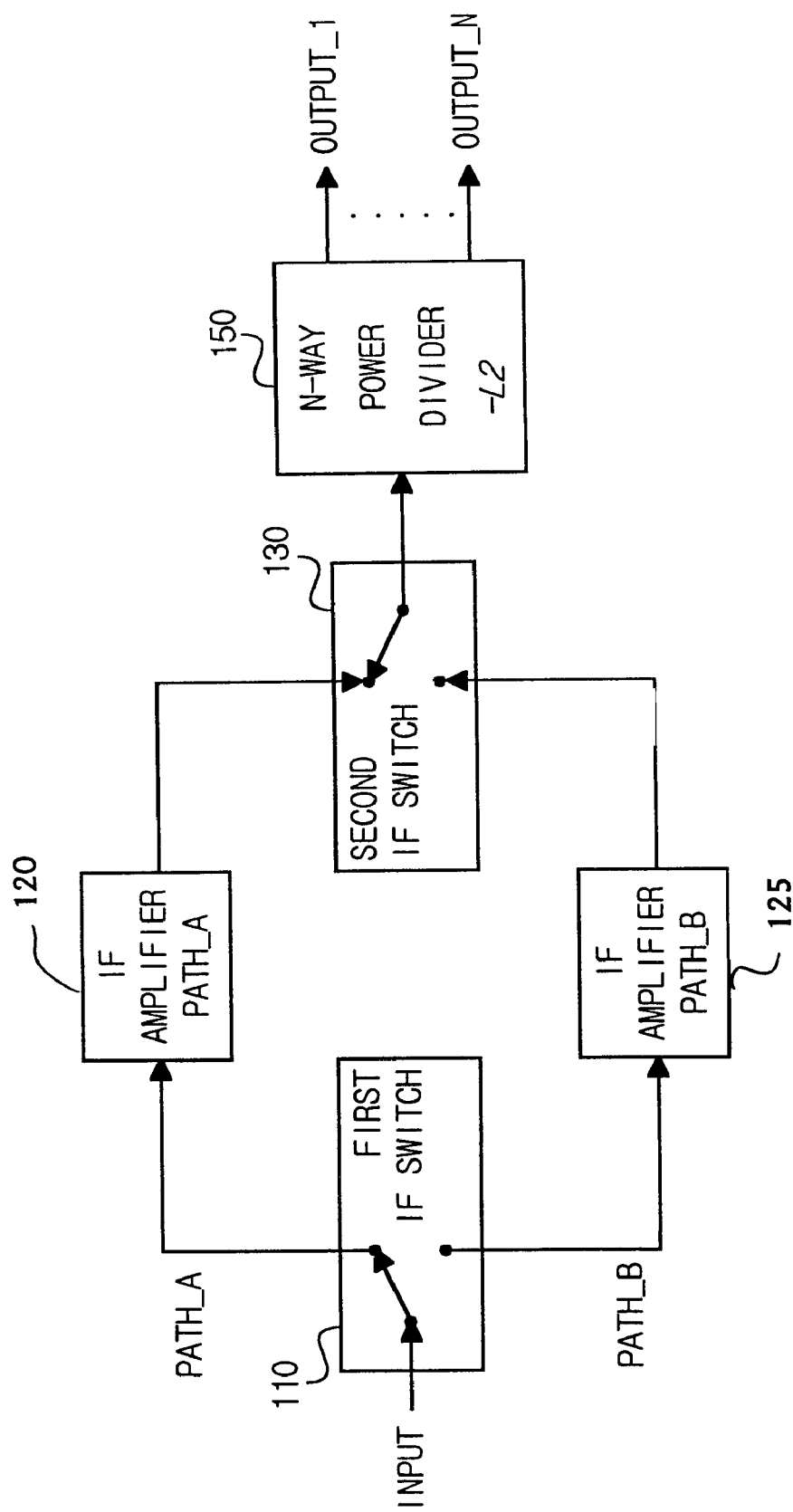
FIG. 6 is a block diagram of an exemplary IF amplifier/divider which illustrates a state of selecting a first path in accordance with the present invention.
Figure 7:
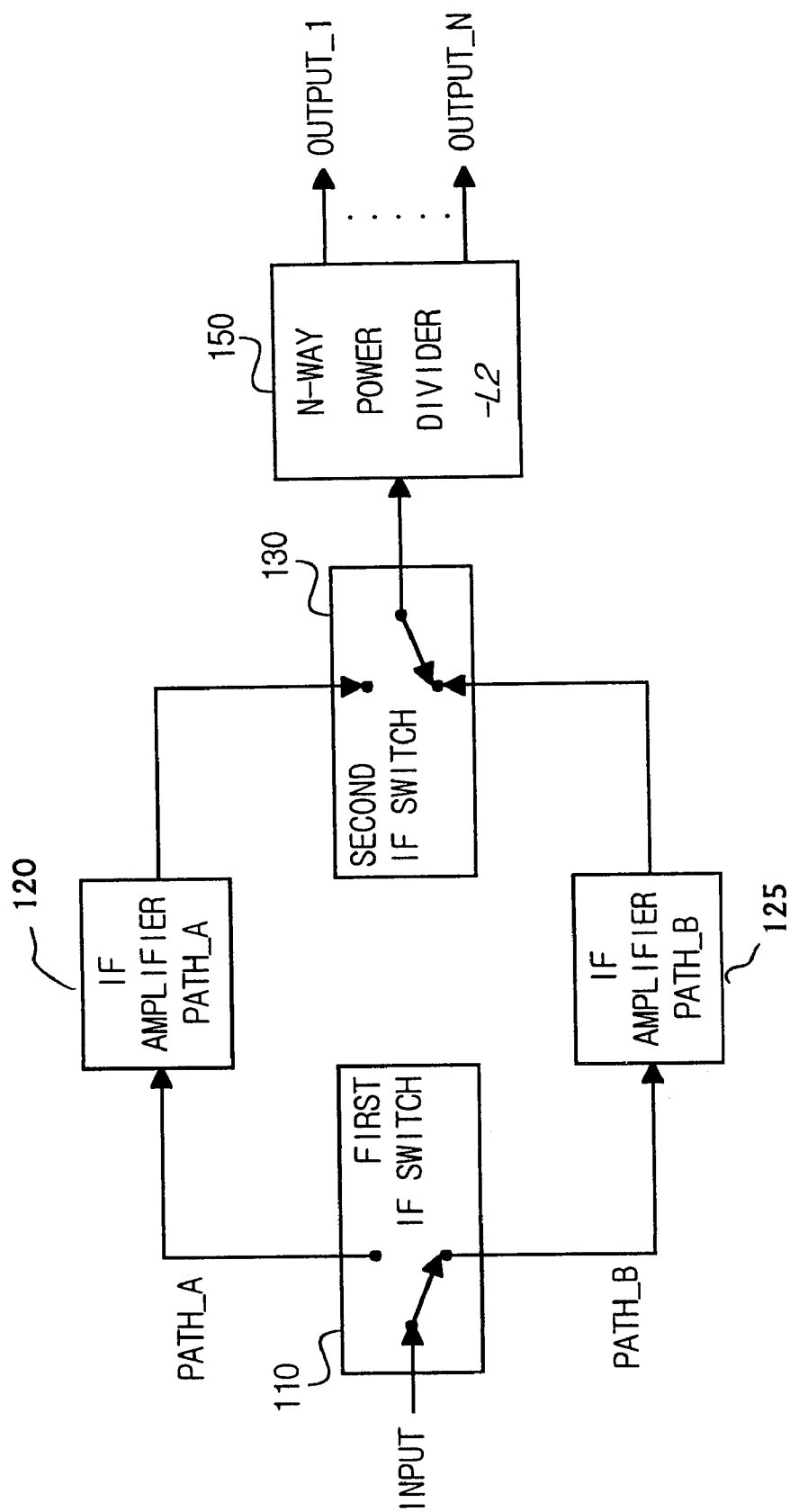
FIG. 7 is a block diagram of an exemplary IF amplifier/divider which illustrates a state of selecting a second path in accordance with the present invention.

Referring now to FIG. 6, a block diagram of the exemplary IF amplifier/divider illustrates a state when the first and second IF switches 110 and 130 select the IF amplify path_A according to the present invention. As illustrated, when the IF switches 110 and 130 (which are controlled by the switch control circuit 160 of FIG. 5) select an IF amplify path_A, a signal received from the digital MODEM 200 (not shown) is transmitted via the path_A to the N-way power divider 150. On the other hand, FIG. 7 is a block diagram which illustrates a state when the first and second IF switches 110 and 130 select the IF amplify path_B according to the present invention. As illustrated, when the first and second IF switches 110 and 130 (which are controlled by the switch control circuit 160) select an IF amplify path_B, a signal received from the digital MODEM 200 (not shown) is transmitted via path_B to the N-way power divider 150.

The N-way power divider 150 operates by dividing the amplified signal transmitted via IF amplify path_A or path_B into N output signals and transmits them via N paths. For example, when two outputs are demanded, the N-way power divider 150 divides the signal into two outputs and when four outputs are demanded, the N-way power divider 150 divides the signal into four outputs. The power divider terminates the non-used output ports.

The aforementioned N-way power divider 150 has an insertion loss L2 and the amount of insertion loss L2 depends on the number of output signals. Generally, a two-way power divider has approximately 3.3 dB of insertion loss and four-way power divider has approximately 6.3 dB of insertion loss. The attenuators 140, 142 and 144 (shown in FIGS. 3 and 4) have a predetermined attenuation L1. Therefore, in order to make the gain of each IF amplify path 0 db, the attenuation value L1 is determined according to the equation:

$$L1=G-A-L2 \text{ [dB]},$$

where G is the gain of the IF amplifiers 120 and 125, A is the overall gain of the IF amplifier/divider 100, and L2 is the insertion loss of the N-way power divider.

As stated above, when a fault is detected in one of the IF amplify paths of the self-switched IF amplifier/divider circuit 100, a switch operation from the failed path to the normal path (for example from path_A to path_B when path_A has failed) is automatically implemented without any command. Advantageously, this self-switch function poses no problem with the operation of the circuit and significantly improves reliability and independence of the system. Furthermore, because the gain of the entire IF amplify path is 0 dB, the self-switched IF amplifier/divider 100 can advantageously be applied to the conventional base station without changing the signal level.

Figure 8:
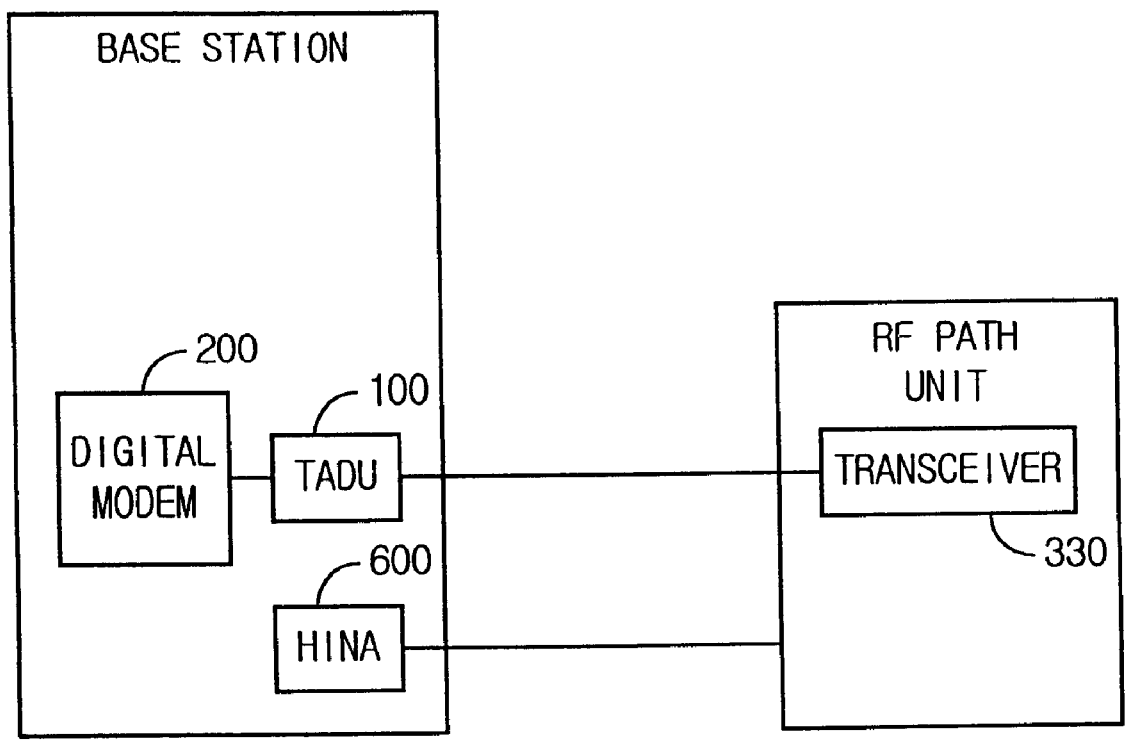
FIG. 8 illustrates a connection of a pilot signal generator according to the present invention.

Referring now to FIG. 8, a diagram illustrates a connection of a pilot signal generator according to the present invention. It is to be appreciated that an RF path unit of the pilot signal generator of the present invention is portable and does not require installation within the system. An IF amplifier/divider 100 (denoted by TADU), which is installed in the base station, provides a signal to a transceiver 330 of a RF path unit. As illustrated, the RF path unit is installed externally and a pilot signal is generated via the RF path unit. The RF path unit is coupled to a High Speed IPC Node Board Assembly (HINA) 600 and is controlled by the base station.

Figure 9:
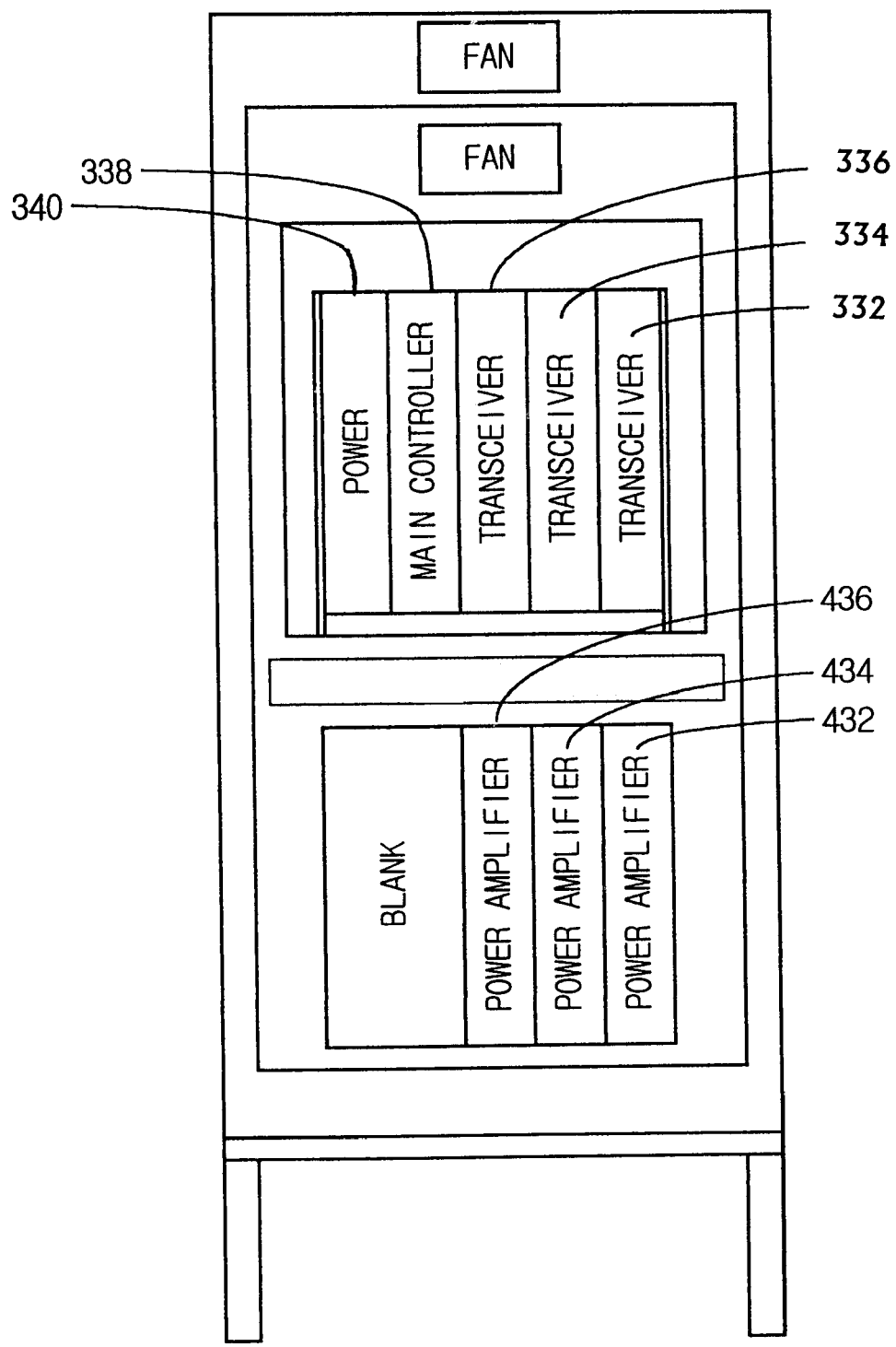
FIG. 9 is a block diagram of an exemplary pilot signal generator according to an embodiment of the present invention.

Referring now to FIG. 9, a block diagram illustrates a pilot signal generator according to one embodiment of the present invention. The pilot signal generator includes a transceiver power supply 340, a main controller 338, a plurality of transceivers 332, 334, 336 and a plurality of power amplifiers 432, 434, and 436 which are coupled to corresponding ones of the transceivers 332, 334, and 336. The number of transceivers and power amplifiers that are utilized is increased or decreased depending on certain conditions. For instance, when the pilot signal generator needs to generate a new pilot signal depending on a change of cell configuration, the addition of a transceiver and a power amplifier board results in a necessary RF path unit.

The pilot signal generator of the present invention is designed for use in both indoor and outdoor environments, and meets the following regulations: an RF output at an antenna port is 16 watts per frequency assignment, which requires the pilot signal generator to be less than 2 m from the base station for transmission of the output; an input voltage is standard at +27 VDC; the transmit frequency is approximately 1810–1870 MHz; an outdoor pilot signal generator is operated at a temperature range of −30° C. to +46° C. and at humidity level in the range of 10% to 90%. The pilot signal generator has an environment controller which turns on a heater at a cold start, provides power when the temperature exceeds a predetermined threshold, and blocks power when a high temperature alarm occurs. The environment controller improves the reliability of the system.

The aforementioned embodiments have many advantages over the existing technology. For instance, they enable performance of inter-frequency hard hand-off with only an addition of an IF amplifier/divider without another digital MODEM; they balance coverage areas of multiple frequencies transmitting all signals converted both by an overhead channel and by a traffic channel; they facilitate maintenance since they are controlled by a base station and their modular design allows them to be easily inserted into, or extracted from, the system (i.e., every board of the pilot signal generator is a module).

Although illustrative embodiments of the present invention have been described herein with reference to the accompanying drawings, it is to be understood that the invention is not limited to those precise embodiments, and that various other changes and modifications may be affected therein by one skilled in the art without departing from the scope or spirit of the invention. All such changes and modifications are intended to be included within the scope of the invention as defined by the appended claims.

What is claimed is:

1. A pilot signal generator in a base station for generating an identifying pilot signal corresponding to a target base station in order to perform inter-frequency hard hand-off in a code division multiple access (CDMA) cellular system, said pilot signal generator comprising:

an intermediate frequency (IF) amplifier/divider for dividing an intermediate frequency (IF) signal received from a digital MODEM into a first signal and a second signal;

a service radio frequency (RF) path unit for up-converting said first signal of said divided IF signal into a first radio frequency (RF) signal and transmitting said first RF signal, said service RF path unit being utilized for actual communication; and a radio frequency (RF) path unit for up-converting said second signal of said divided signal into a second RF signal and transmitting said second RF signal, said RF path unit being utilized for transmission of a pilot signal, and said second RF signal being an identifying pilot signal corresponding to said target base station for performing said hard hand-off.

2. The pilot signal generator of claim 1, wherein said IF amplifier/divider transfers a primary frequency signal to said service RF path unit and said RF path unit, said primary frequency signal being generated by said digital MODEM and being available to all base stations in said system.

3. The pilot signal generator as set forth in claim 1, wherein said RF path unit comprises:

a transceiver for up-converting said second signal of said divided IF signal from said intermediate frequency amplifier/divider into said pilot signal of said target base station; and a power amplifier for amplifying said up-converted signal and transmitting said amplified signal to a transmitting antenna.

4. The pilot signal generator as set forth in claim 1, wherein said RF path unit transmits every signal converted by one of an overhead channel and a traffic channel in order to balance a coverage area of multiple-frequencies.

5. The pilot signal generator as set forth in claim 1, wherein said RF path unit is portable and is coupled to said IF amplifier/divider with a cable.

6. The pilot signal generator as set forth in claim 3, wherein said transceiver and said power amplifier of said RF path unit are modular units, thereby allowing them to be inserted into, or removed from, said pilot signal generator.

7. The pilot signal generator as set forth in claim 1, wherein said RF path unit is allocated to every subcell.

8. The pilot signal generator as set forth in claim 1, wherein the number of said RF path unit can be increased and decreased in accordance with a change in a cell configuration.

9. The pilot signal generator as set forth in claim 1, wherein said base station is operatively coupled to said RF path unit via a high speed IPC node board assembly (HINA), said RF path unit being controlled by said base station.

10. The pilot signal generator as set forth in claim 1, wherein said RF path unit is designed for use in an indoor and outdoor environment.

11. The pilot signal generator as set forth in claim 1, wherein a power output of said RF path unit is 16 watts.

12. The pilot signal generator as set forth in claim 1, wherein said RF path unit is operated with 27 volts (DC) direct current.

13. The pilot signal generator as set forth in claim 1, wherein said RF path unit transmits a frequency in a range of 1810 MHz to 1870 MHz.

14. The pilot signal generator as set forth in claim 10, wherein said RF path unit is operated in said outdoor environment at a temperature in the range of −30 degrees C. to +46 degrees C. and at a humidity level in the range of 10% to 90%.

15. The pilot signal generator as set forth in claim 14, wherein said RF path unit includes an environment controller which provides power when the temperature exceeds a predetermined threshold value by turning on a heater at a cold start and blocks power in response to a temperature alarm.

16. The pilot signal generator as set forth in claim 1, wherein said IF amplifier/divider comprises:

an IF amplifier for amplifying an IF signal, said IF signal being received from said digital MODEM;

an attenuator for attenuating unnecessary gain of said amplified IF signal, said unnecessary gain being generated by the entire IF amplifier/divider circuit; and a N-way power divider for dividing said attenuated signal to at least one RF path unit.

17. The pilot signal generator as set forth in claim 16, wherein said IF amplifier, said attenuator and said N-way power divider of said IF amplifier/divider are modular units, thereby allowing said units to be separately inserted into, and extracted from, said pilot signal generator.

18. The pilot signal generator as set forth in claim 16, wherein said IF amplifier/divider further comprises:

a plurality of paths, each of said paths having an IF amplifier for amplifying an IF signal received from said digital MODEM and an attenuator for attenuating unnecessary gain of said amplified IF signal;

a N-way power divider, selectively coupled to each of said paths, for dividing said attenuated signal on said coupled path to at least one RF path unit;

means for detecting a fault on any one of said paths; and means for automatically selectively coupling a non-fault path to said N-way power divider when a fault is detected on one of said paths.

19. The pilot signal generator as set forth in claim 1, wherein said IF amplifier/divider comprises:

a first IF switch for selectively coupling an IF signal received from said digital MODEM to one of a first IF amplify path and a second IF amplify path;

a first IF amplifier for amplifying said IF signal selectively coupled to said first IF amplify path;

a second IF amplifier for amplifying said IF signal selectively coupled to said second IF amplify path;

a second IF switch, selectively connected to an output of said first IF amplifier in said first IF amplify path and said second IF amplifier in said second IF amplify path;

an attenuator, coupled to said second IF switch, for attenuating unnecessary gain of said amplified IF signal selectively coupled to said attenuator by said second IF switch, said unnecessary gain being generated at the entire IF amplifier/divider circuit; and a N-way power divider for transmitting the attenuated signal to N paths.

20. The pilot signal generator as set forth in claim 19, wherein said first IF switch and said second IF switch select the same path at a given time.

21. The pilot signal generator as set forth in claim 19, wherein said IF amplifier/divider further includes a switch control circuit for controlling the operation of said first and second IF switches.

22. The pilot signal generator of claim 21, wherein said switch control circuit includes means for detecting an alarm state of said first and second IF amplify paths when a fault occurs in at least one of said IF amplify paths, and blocks said IF amplify path having said detected fault, while connecting a non-faulting one of said IF amplify paths by controlling said first IF switch and said second IF switch.

23. The pilot signal generator of claim 22, wherein said alarm state detecting means senses an alarm signal from said one of said first IF amplifier and said second IF amplifier.

24. The pilot signal generator as set forth in claim 21, wherein said switch control circuit controls said first and second IF switches to select said first IF amplify path at an initialization state of said circuit.

25. The pilot signal generator as set forth in claim 22, wherein said switch control circuit triggers a first alarm LED when a fault is detected in said first IF amplifier and triggers a second alarm LED when a fault is detected in said second IF amplifier.

26. The pilot signal generator as set forth in claim 19, wherein said attenuation of said attenuator is determined by:

$$L1=G-A-L2 \text{ [dB]},$$

where L1 is said attenuation of said attenuator, A is the overall gain of said IF amplifier/divider, G is a gain of each of said IF amplifier, and L2 is an insertion loss of said N-way power divider.

27. The pilot signal generator as set forth in claim 19, wherein said elements comprising said IF amplifier/divider are modular units, thereby allowing said units to be separately inserted into, and extracted from, said pilot signal generator.

28. The pilot signal generator as set forth in claim 1, wherein said IF amplifier/divider comprises:
 a first IF switch for selectively coupling an IF signal received from said digital MODEM to one of a first IF amplify path and a second IF amplify path;
 a first IF amplifier for amplifying said IF signal selectively coupled to said first IF amplify path;
 a first attenuator, connected to the output of said first IF amplifier, for attenuating unnecessary gain of said amplified IF signal output from said first IF amplifier, said unnecessary gain being generated by the entire IF amplifier/divider circuit;
 a second IF amplifier for amplifying said IF signal selectively coupled to said second IF amplify path;
 a second attenuator, connected to the output of said second IF amplifier, for attenuating unnecessary gain of said amplified IF signal output from said second IF amplifier, said unnecessary gain being generated by the entire IF amplifier/divider circuit;
 a second IF switch, selectively connected to the output of said first attenuator and said second attenuator, for selecting between one of said attenuated IF signals in said first and second amplify paths; and
 a N-way power divider, connected to said second IF switch, for transmitting said attenuated IF signal selected by said second IF switch to N paths.

29. A pilot signal generator as set forth in claim 28, wherein said first and second IF switches select the same path at a given time.

30. A pilot signal generator as set forth in claim 28, wherein said IF amplifier/divider further comprises a switch control circuit for controlling the operation of said first and second IF switches.

31. The pilot signal generator of claim 30, wherein said switch control circuit includes means for detecting an alarm state of said IF amplify paths when a fault occurs in at least one of said IF amplify paths, and blocks said IF amplify path with said detected fault, while connecting a non-faulting one of said IF amplify paths by controlling said first IF switch and said second IF switch.

32. The pilot signal generator as set forth in claim 30, wherein said switch control circuit controls said first and second IF switches to select said first IF amplify path at an initialization state of said circuit.

33. The pilot signal generator as set forth in claim 31, wherein said switch control circuit triggers a first alarm LED when a fault is detected in said first IF amplifier and triggers a second alarm LED when a fault is detected in said second IF amplifier.

34. The pilot signal generator as set forth in claim 28, wherein said attenuation of said first and second attenuators is determined by:

$$L1=G-A-L2 \text{ [dB]},$$

where L1 is said attenuation of said first and second attenuators, A is the overall gain of said IF amplifier/divider, G is a gain of each of said IF amplifiers, and L2 is an insertion loss of said N-way power divider.

35. The pilot signal generator as set forth in claim 28, wherein said elements of said IF amplifier/divider modular units, thereby allowing said units to be separately inserted into, and extracted from, said pilot signal generator.

36. A method for generating a pilot signal for an inter-frequency hard hand-off in a code division multiple access cellular system having at least one base station that utilizes an identifying pilot signal corresponding to a target base station to perform said inter-frequency hard hand-off, said method comprising the steps of:
 generating an intermediate frequency (IF) signal for communication;
 dividing said IF signal into a first signal and a second signal;
 up-converting said first signal and transmitting said up-converted first signal to a service RF path unit for communication; and
 up-converting said second signal and transmitting said up-converted second signal to at least one RF path unit for generating a pilot signal of said target base station.

37. The method as set forth in claim 36, wherein said RF path unit transmits every signal converted by one of an overhead channel and a traffic channel in order to balance coverage areas of multiple frequencies.

38. The method as set forth in claim 36, wherein said IF signal for communication is a primary frequency signal which is generated by a digital MODEM.

39. The method as set forth in claim 36, wherein said RF path unit is allocated to every subcell.

40. The method as set forth in claim 36, wherein the number of said RF path unit can be increased or decreased based on a change of cell configuration.

* * * * *